INVENTORS
Kenneth M. Stevenson Jr.
Robert L. Berg
James L. Stockard
Robert F. Shipp &
Arnold A. Weiss Thomas N. Young
ATTORNEY

INVENTORS
Kenneth M. Stevenson Jr.
Robert L. Berg
James L. Stockard
Robert F. Shipp &
Arnold A. Weiss Thomas N. Young
ATTORNEY

United States Patent Office 3,509,765
Patented May 5, 1970

3,509,765
INERTIAL NAVIGATION SYSTEM
Kenneth M. Stevenson, Jr., Palos Verdes Estates, Calif., and Robert L. Berg, Milwaukee, and Arnold A. Weiss, Fox Point, Wis., James L. Stockard, Lexington, Mass., and Robert F. Shipp, Milwaukee, Wis., assignors to General Motors Corporation, Detroit, Mich., a corporation of Delaware
Filed Dec. 17, 1965, Ser. No. 514,467
Int. Cl. G01c 21/18
U.S. Cl. 73—178    13 Claims

ABSTRACT OF THE DISCLOSURE

A first platform portion disposed in a three-axis gimbal system carries gyros and accelerometers whose input axes are maintained in a locally horizontal plane. A second portion rotatable about a vertical axis of the first carries a single gyro and a single accelerometer having vertical input axes for detecting azimuth changes. The second portion is azimuthally stabilized relative to inertial space. A synchronous motor located on the second portion continuously rotates the first portion about the vertical at a rate above earth rate and constant relative to inertial space to suppress the effects of low frequency errors in the horizontal plane instruments. Such rotation takes place during the normal navigating mode of the system.

Summary of the invention

This invention relates to inertial navigation systems for determining the position, velocity and accelerations of a body and more particularly to inertial navigation apparatus in which a gyroscopically stabilized instrument platform is rotated about a predetermined axis to suppress instrument-produced errors and to permit the calibration of non-suppressed errors.

An inertial navigation system for a vehicle typically includes a rigid platform on which are mounted a plurality of inertial sensing instruments including gyroscopes for sensing angular motion of the platform and accelerometers for sensing vehicle accelerations along selected axes. The platform is generally mounted in the vehicle by means of gimbals, the purpose of which is to isolate the platform from vehicle rotational motion. It is noted, however, that various non-gimballed systems are also known. Where a gimballed system is used, means are provided for stabilizing the platform with respect to inertial space in order to provide a reference from which vehicle attitude and motion can be measured. The stabilization means usually includes feedback loops connected between the gyroscopes and gimbal torquing means and operative to sense disturbances of the inertial orientation of the stable platform and apply counter effects. Since the gyros and the associated stabilization loops isolate the platform from vehicle rotational motions and maintain it at controllable orientations relative to inertial space, means such as resolvers between the gimbals may be employed to provide information indicating the attitude of the vehicle with respect to inertial space or the earth. In addition, the accelerometers mounted on the platform may be employed to provide information regarding the acceleration, velocity and displacement of the vehicle within a predetermined coordinate axis system defined by the platform stabilization system. By applying the information from the inertial sensing instruments to, for example, a digital computer capable of continuously solving predetermined navigation equations, the position of the vehicle may be constantly determined for manual or automatic control purposes.

A modern inertial navigation system is a physical manifestation of a substantially ideal navigation and computation scheme. However, as a practical matter, various sources of error exist in the most precisely constructed systems. The errors which are caused by these sources tend to be cumulative with the passage of time and therefore may seriously affect system utility in long-time-of-flight applications where high accuracy is required. Therefore it is important to eliminate or suppress the effects of the error sources where possible and to isolate, calibrate and compensate for those errors which cannot be eliminated or suppressed.

The gyroscopes, for example, as relatively complex electromechanical devices, exhibit, in practice, characteristics other than those of perfect descriptors of inertially fixed directions. Deviations from the ideal are caused by gyroscopic drifts, some of which have required costly, elaborate and precise design and fabrication procedures for their reduction to levels compatible with many navigational requirements. These error sources include gyro wheel assembly mass unbalances, residual torques on the wheel assembly due mainly to flex leads and compliance drifts which appear under acceleration or vibration due to lack of equal structural stiffnesses in all directions. In operation similar effects are often caused by errors in torquer scale factors which define the current needed to torque the gyro to produce a unit spin axis precession rate. Precise system fabrication is also generally necessary to minimize misalignment of instrument input axes with respect to either each other or to other references or both. All of these error sources are manifested in system use as gyro drifts and the economical suppression of their effects upon accuracy of navigation is a prime objective of adequate system design.

The presence of these and other error sources in the navigation system has heretofore necessitated elaborate and complicated compensations for use by flight computing apparatus. Alternatively or supplementarily, externally-aided-in-flight position fixes have been used to update the information derived from the inertial navigation equipment. It can be seen that in circumstances where an external position fix is unobtainable, or unreliable, intolerable navigation errors might obtain especially in long-time-of-flight situations. Further, even where reliable fixes are obtainable, their utility in system calibration against future navigation errors may be restricted because of the complex manner in which individual instrument errors propagate into system navigational errors and by the dependence of that propagation mechanism upon time and direction of travel.

In accordance with the present invention, sources of error seriously affecting inertial navigation system accuracy may be effectively eliminated or suppressed. Further, the principal remaining unsuppressed errors may be more readily isolated and calibrated to permit their effective compensation for subsequent navigation. In general this may be accomplished by mounting the inertial sensing instruments, including both gyros and accelerometers, on a rigid platform and by rotating the platform about a selected axis at a precisely definable rate relative to inertial space. This rotation causes a periodic reversal, relative to the inertial frame of reference (or to frames of reference which are rotating slowly relative to inertial space), of low frequency errors, attributable to the inertial instruments, which are operative along axes normal to the rotation axis. The effect of these errors upon navigation accuracy in a plane normal to the rotation axis is thereby suppressed. Among these errors are changes in gyro drifts, accelerometer null shifts, certain compliance drift effects and effects due to input axis misalignments out of the plane normal to the rotation axis. Further, if the rotation axis is selected to lie along the direction of the net acceleration vector operative on the carrying vehicle, a suppression of the effects of gyroscopic drift components along axes normal to the axis of rotation due to mass unbalance of the gyro wheel assemblies also occurs.

In accordance with a specific form of the invention designed for navigation close to the surface of the earth, the instruments may be mounted on the platform such that the input axes thereof lie along orthogonal X and Y (horizontal) navigation axes and a mutually orthogonal Z (azimuth or vertical) axis. By rotating the platform about the vertical or Z axis, the inertial sensing instruments associated with the horizontal axes are rotated such that the sense of the horizontal drifts due to compliance is reversed twice each revolution. Thus, the effects of these error sources are virtually canceled either once or twice a revolution so that these errors are essentially suppressed. By so suppressing these sources of horizontal platform drift, it is possible to isolate and calibrate for compensation purposes the effect of the horizontal components of gyro torquer scale factor uncertainties, if any, and the effect of the azimuth platform drift, if any. Since these two remaining sources of error produce essentially orthogonal effects, they may be effectively isolated from each other and compensated. Thus the invention provides suppression and compensation of errors, the result being not only a more accurate inertial navigation system than has heretofore been available but also one that can for the first time adequately calibrate, compensate, and align itself more readily and rapidly in a single-stage alignment process.

As a further feature of the invention, the instrument error compensations of the inertial navigation system may be more readily effected with external navigation data such as that available from a single position fix or Doppler radar equipment. This simplified supplementation of the inertial navigation system information is made possible by the aforementioned confinement of significant unsuppressed inertial sensing instrument errors to horizontal gyro torquer scale factor uncertainties and azimuth platform drift errors which are orthogonal error components and thus produce effects which may be easily resolved and used to provide system calibration information.

In accordance with a specific embodiment of the present invention, navigation is performed while the stable platform is rotated along with at least the horizontal sensing instruments at a known rate about the azimuth axis. Since computation is carried out in an orthogonal coordinate reference frame which, in general, differs from that defined by the instruments by orientations which include the effect of the platform azimuth rotation rate, the rotating instrument output information is translated into this orthogonal coordinate frame for application to the navigation computer.

In a particular embodiment of the invention which will be described for illustrative purposes, the stable platform may be effectively divided into two portions which in this specification are arbitrarily designated as the "lower platform" and the "upper platform" or "turret." These two platforms are mechanically relatively rotatably connected and prealigned to provide parallel instrument mounting surfaces which are mutually orthogonal to the azimuth axis. The horizontal gyros and accelerometers are mounted on the lower platform and the azimuth gyro is mounted on the upper platform. A vertical accelerometer, if used, may also be mounted on the upper platform. Means are provided for rotating the lower platform with respect to the upper platform at a precisely known rate and maintaining the upper platform stationary or rotating at a known rate with respect to inertial space. Since the azimuth gyro is mounted on the upper platform and is used via a gimbal stabilization loop to effect azimuth control of the upper platform relative to inertial space, this platform provides a stable reference for the rotation of the lower platform.

The present invention may be best understood by reference to a detailed description of a navigation system, including the aforementioned specific embodiment of the invention. The following description is to be taken with the accompanying drawings of which.

Figure 1:
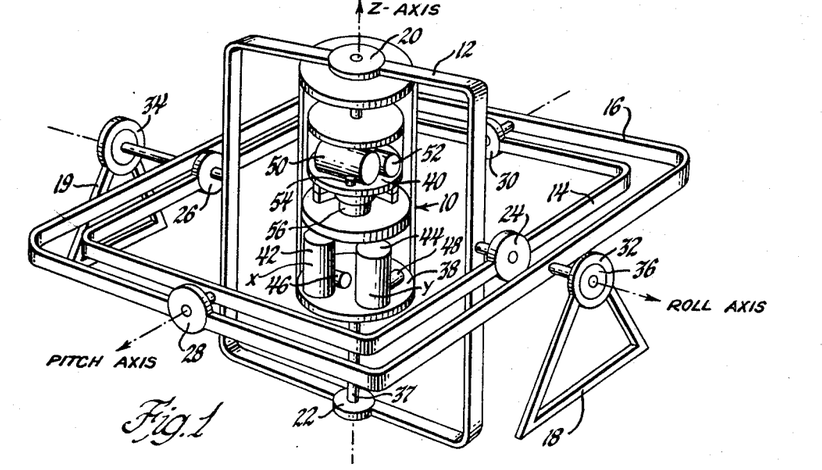
FIG. 1 is a schematic drawing of the inertial navigation platform and gimbal mounting system.

The inertial sensing instruments are the sources of information upon which the inertial navigation system operates. FIG. 1 shows the arrangement of inertial sensing instruments and the platform employed in the specific embodiment of the invention as well as the gimbal system which is used to mount the instruments and the platform on the vehicle which is not shown. The inertial instrument platform is generally designated at 10 and is suspended at the center of a four-gimbal set to isloate the platform from the motion of a vehicle to which the gimbal set is attached. The platform 10 forms a first gimbal and is mounted in an inner gimbal ring 12 for relative rotation about the Z axis which is also referred to as the azimuth axis when discussing the navigation performance of the system. Gimbal ring 12 forming the second gimbal is rotatably connected to a middle gimbal ring 14 to provide relative rotation about the vehicle level-flight roll axis. Gimbal ring 14 which forms a third gimbal is rotatably connected to an outer gimbal ring 16 to provide relative rotation of the platform about the pitch axis as shown. The relatively rotatable gimbal rings 12, 14 and 16 provide relative rotation of the platform 10 about the three mutually orthogonal axes of the vehicle and thus isolate the platform from all vehicle rotational motion, except that which occurs from travel about the near-spherical earth. However, it is well known that to provide an all-attitude capability in which gimbal lock does not occur, a fourth redundant gimbal must be provided. Accordingly, gimbal rings 16 is rotatably mounted in a set of standards 18 and 19, the axis of rotation corresponding with the vehicle roll axis. The standards 18 and 19 may be fixed to some convenient portion of the vehicle.

It is to be understood that the choice of designation of axes for the inertial reference unit shown in FIG. 1 is arbitrarily made and that the axes may be interchanged as suits the particular designer. In addition, it should be noted that all gimbals may be designed to have unlimited freedom of rotation. It is sufficient, however, in the present system to prevent gimbal lock to limit the inner roll axis freedom to 25 degrees rotation in either direction.

All of the gimbal rings 12, 14 and 16 as well as the various portions of the platform 10 may be constructed of cast magnesium. Each gimbal ring may be supported for rotation on two pair of duplex type, preloaded torque tube ball bearings. Bearings of this type are well known to those skilled in the art and will not be shown or described in detail.

For the purpose of stabilizing the platform 10 each gimbal ring mounting is provided with a torque motor connected into a gimbal stabilization servo loop which also includes one or more gyros. The platform alignment with respect to the navigation coordinates is controlled from computer-generated quantities which are entered into the stabilization loops as gyro torquing signals. Information concerning the relative attitude of the vehicle and platform 10 (as measured by the degree of rotation of each of the gimbal rings) is provided by resolvers associated with each gimbal axis. More specifically, a first torque motor 20 is connected between gimbal ring 12 and one end of the platform 10 to torque the entire platform unit about the azimuth axis. In addition, a coordinate resolver 22 is connected between the gimbal ring 12 and the other end of platform 10 to monitor the angle through which platform 10 is rotated relative to gimbal ring 12.

Moving from the inner gimbal outwardly, a second torque motor 24 is provided between gimbal ring 12 and gimbal ring 14 to torque the platform 10 about the inner roll axis. A second resolver 26 is connected on the other side of gimbal ring 12 at the rotatable connection with gimbal ring 14 for the purpose of monitoring the degree of relative rotation about the inner roll axis.

In a similar fashion, a pitch axis torque motor 28 is connected between the outer gimbal ring 16 and the middle gimbal ring 14. A pitch axis resolver 30 is also connected between gimbal rings 14 and 16 to measure the relative rotation therebetween. Finally, a torque motor 32 is provided for torquing gimbal ring 16 with respect to the standards 18 and 19, and the resolver 34 is provided for measuring the degree of relative rotation therebetween. The redundant roll axis gimbal control comprising torque motor 32 and resolver 34 also includes a tachometer 36, which may be of the permanent magnet type, to eliminate the need for a secant function gain element in the control loop for this outer control system and to provide simple stabilization of this loop during coarse preflight alignment.

Continuing the description of FIG. 1 in further detail, it can be seen that the main platform unit 10 is mounted for rotation with respect to gimbal ring 12 on a beryllium shaft 37. The lower portion of the main platform unit 10 defines the lower platform 38 which is integral with the main platform unit 10. In addition, an upper platform 40, also designated as the "turret," is mounted within the main platform unit 10 in such a manner as to allow relative rotation of the upper platform 40 with respect to the lower platform 38. The lower platform 38 carries the horizontal axes or X and Y axis gyros 42 and 44, respectively. These gyros are single degree of freedom gyros mounted on the platform with the input axes aligned to be mutually orthogonal and defining a plane which is parallel to the plane of lower platform 38. The rotor spin axes of gyros 42 and 44 also lie in the horizontal plane. In addition, mounted on the lower platform 38 are the horizontal axis or X and Y axis accelerometers 46 and 48, respectively. These accelerometers may be of the force-balance type. The input axes of the accelerometers 46 and 48 are mutually orthogonal and correspond to the input axes of the gyros 42 and 44, respectively. The inertial sensing instruments 42, 44, 46 and 48 may be prealigned in mounting brackets which are then bolted and pin referenced to the lower platform 38 to provide precise alignment.

The upper platform 40 has mounted thereon the azimuth or Z axis gyroscope 50 having an input axis parallel to the azimuth axis as shown in FIG. 1. In addition, the upper platform 40 may carry a vertical accelerometer 52 to provide information for computing vertical velocity and altitude. It is to be understood that alternative means may be employed to provide altitude information leading to the elimination of the vertical accelerometer 52. The sensitive axes of the inertial sensing instruments 50 and 52 are mutually orthogonal to the horizontal axes of the horizontal sensing instruments mounted on the lower platform 38.

Figure 2:
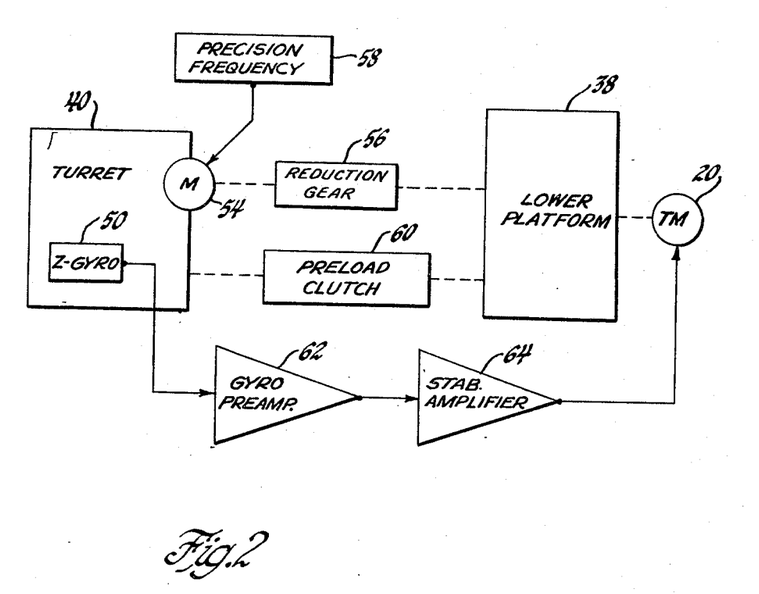
FIG. 2 is a block diagram of the turret drive system used to rotate the lower platform of the platform with respect to the upper platform.

Error suppression in accordance with the invention may be accomplished by rotating the lower platform 38 at a precisely defined rate with respect to the upper platform 40. Since the upper platform orientation is defined in azimuth with respect to inertial space, the rotation of the lower platform then occurs at an accurately known rate with respect to inertial space. This relative rotation is provided by a synchronous motor 54 which is mounted on the upper platform 40 and a reduction gear drive 56 which interconnects the upper and lower platforms 40 and 38, respectively. As shown in FIG. 1, the diameter of the upper platform 40 is somewhat less than that of the lower platform 38 and the main platform unit 10 in order to allow relative rotation between the platforms. As best shown in FIG. 2, the synchronous motor 54 is mechanically connected to the lower platform 38 through a reduction gear drive 56 to rotate the lower platform 38 at a predetermined rate with respect to upper platform 40. This rate is, in the present instance, constant and determined by the output of a stable frequency source 58. Backlash effects in the reduction gear drive 56 are avoided by using a spring loaded drag clutch 60 (FIGURE 2) between the upper and lower platforms. Clutch 60 provides sufficient friction load to eliminate gear backlash under all environmental conditions for the unidirectional relative rotation employed in the specific application.

As further shown in FIG. 2, the platform rotational drive including synchronous motor 54 is effectively included in the azimuth stabilization loop, which also contains preamplifier 62, amplifier 64 and torque motor 20. The action of this stabilization loop maintains the turret 40 in an azimuth orientation determined by the azimuth gyro torquing program. Thus, the absence of azimuth gyro torquing results in an inertially fixed orientation of the upper platform 40 about the azimuth axis. The lower platform accordingly rotates around the azimuth axis with respect to inertial space at a constant rate defined by the stable frequency source and the synchronous motor. The torque required to start this rotation and maintain it in the presence of friction on the bearing derives from the normal action of the azimuth stabilization loop through torque motor 20. With this arrangement it is also possible to precess Z gyro 50 at a known rate to suppress Z gyro compliance errors without modification of the horizontal error suppression principle. It should be noted that the rate of rotation may not be uniform or periodic with respect to the gimbal support frame but is constant with respect to inertial space.

As previously described, the rotation of the horizontal sensing instruments carried by the lower platform 38 modulates the effects in the slowly rotating navigation reference frame of certain errors inherent in those instruments thereby suppressing the importance of those errors to the navigational problem. Among these are the drifts of horizontal gyros 42 and 44 and the null shift or bias change errors of the horizontal accelerometers 46 and 48 as well as certain input axis misalignment errors of these gyros and accelerometers. The rotation rate at which these errors are effectively suppressed must be substantially above earth rate. Rotation at earth rate maintains the orientation of the inertial sensing instruments constant with respect to the local earth coordinates and thus has no effect in modulating the above mentioned errors. The present system is designed for one half r.p.m. rate which corresponds to 720 earth rates. Either higher or lower rotational rates may be employed in accomplishing the desired end result of the present invention.

Alternative means of providing the precise azimuth rotation rate may be used. With a split platform the relative rotation between upper and lower members may be created by a servo drive. Also, as an alternative to the split platform arrangement shown in FIGS. 1 and 2, it may be desirable to mount the inertial sensing instruments, including a vertical accelerometer, on a single platform and to rotate that platform at a known rate by gyro precession means. Rotating the azimuth gyro suppresses its compliance error effects, thereby enhancing system performance. In such a system the azimuth gyro 50 may be supplied directly with a precession signal of known character provided either electrically, by permanent magnet means internal to the gyro or by deliberate creation of an unbalanced gyro wheel assembly. The gyro error signal is then amplified and applied to the torque motor 20 to rotate the entire platform including all of the inertial instruments used at a known rate about the azimuth axis. The platform may be isolated from vehicle motion by a complete gimbal set as described or by a signal rotation gimbal in the case of a "hardmounted" system.

While the specific arrangement of FIG. 1 is employed for illustration, it is to be understood that in practicing the invention, any configuration of gyros having at least three non-coplanar sensing axes and accelerometers having at least three non-coplanar sensing axes (not necessarily co-linear with the gyro sensing axes) may be used. However, for some applications involving constraints upon motion along one axis, the minimum of two accelerometers may used if their sensing axes lie in the plane normal to that axis.

The apparatus shown in FIGS. 1 and 2 and described above is, of course, designed for use in a system for navigating a vehicle and particularly for navigating with respect to the earth. In the particular example described herein, airborne navigation is contemplated. However, the navigation system which is constructed in accordance with the present invention is equally usable in the navigation of spatial, or land sea going vehicles as well.

Navigation using an inertial guidance or a navigation system involves processing of the information which is obtained from the instruments carried by the platform 10 of FIG. 1. The output signals from the gyros must be processed to stabilize the platform by isolating it from torque disturbances due to gimbal bearing friction and platform unbalance. This is the function of the gimbal stabilization loops which also enable the platform to be commanded to any desired orientation through the agency of torquing signals sent to the gyros. These torquing signals may be obtained by processing of the acceleration signals from the accelerometers which is also necessary to determine rate of travel and position with relation to the earth. Accelerometer signals are taken from the apparatus shown in FIG. 1 by means of conventional slip rings to transfer the signals from the instruments through the relatively rotatable parts of the gimbal system to the computer, preferably a diginal computer. In the present instance, the externally computed gyro torquing signals are transmitted to the gyros back through the said slip ring assembly to implement a vertical indicating system that maintains the Z axis or azimuth axis of the platform 10 parallel at all times to the local gravity vector. In addition, it can be seen that since the platform 10, and especially the lower platform 38 carrying the horizontal inertial sensing instruments, is rotated with respect to inertial space, it is necessary to transform the signals from the rotating reference of the platform 10 to the coordinate system employed in the navigation computations. Since the azimuth rotation rate relative to inertial space of platform 10 is precisely known, it is only necessary to establish an inital value of the platform's inertial azimuth orientation to define that orientation during subsequent operation. This value is continuously evaluated by the computer and used in the signal transformations between the rotating frame of the platform 10 and the selected computational frame of reference.

Figure 3:
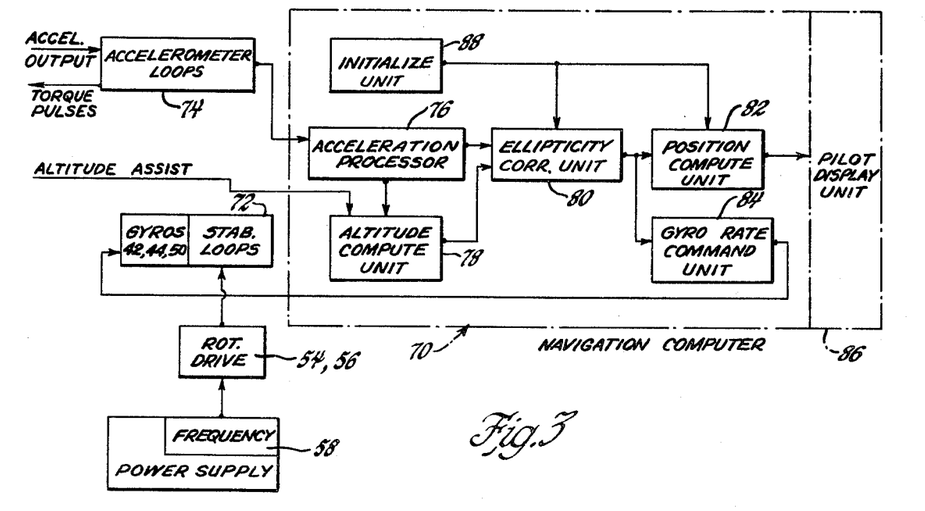
FIG. 3 is a block diagram of the navigation system employing an embodiment of the present invention.

Referring to FIG. 3, the system block diagram is shown in more detail to include a navigation computer 70 of the general purpose digital type which performs the information processing necessary to inertial navigation. The gyros 42, 44 and 50 are shown in block diagram to include respective stabilization loops generally designated at 72. Signals from the accelerometers are connected into the accelerometer force-balance loops generally indicated at 74. Since a pulse torquing feedback loop is employed, the output of the loop 74 is in a digital form and is connected into an acceleration processor unit 76 which is part of the navigation computer 70. The processor 76 includes integrating means for transforming the acceleration signals into velocity signals which are used in the computer 70 as inputs to the navigation equations. Altitude information from the Z accelerometer 52 may be connected into an altitude computing unit 78 which may function in cooperation with barometric altitude measuring apparatus. The outputs of both the accelerometer processor 76 and the altitude computer 78 are connected into an earth ellipticity correction unit 80. The ellipticity correction unit 80 is required as the first step for translation of velocity or ground speed signals from processor 76 into distance computations and gyro torquing inputs. The conversion of the ground speed signals into angular rates is accomplished by division of the signals by the appropriate radii of curvature which in turn are functions of the airborne vehicle's position and height above the surface of the earth. The ellipticity correction unit 80 accomplishes this division and applies output signals to a position computing unit 82 and a gyro rate command unit 84. The output of the position computing unit 82 is connected to a control and display portion 86 of the navigation computer 70 for further processing to provide the desired positional output format. The output of the gyro rate command unit 84 is connected back to the gyros 42 and 44 and the associated stabilization loops 72 where, along with the rotational drive which is produced by the apparatus of FIG. 2, also schematically shown in FIG. 3, the gyros are torqued in such a fashion as to maintain the platform 10 normal to the local vertical vector. An initializing unit 88 is also part of the navigation computer 70 and is employed to initialize the velocity signals in ellipticity correction unit 80 and the position variables in the position computer 82.

Figure 4:
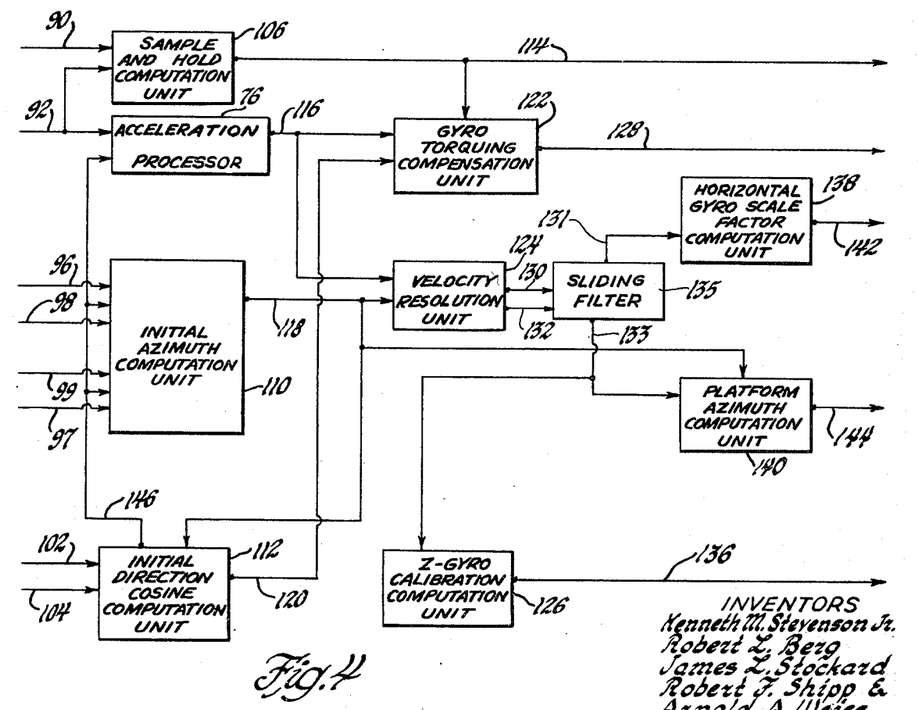
FIG. 4 is a data flow diagram for the gyrocompassing calibration method which is provided by the present invention.

Prior to successful navigation employing an inertial navigation system, the initial orientation of the instrument sensitive axes must be determined and the critical error sources calibrated such that subsequent navigation may be performed with sufficient accuracy. In the present instance, this preflight processing is accomplished in a gyrocompassing mode which is employed to calibrate the drift of the azimuth gyro 50 and the effective torquing scale factor of the horizontal gyros 42 and 44. The data flow diagram for the gyrocompassing mode is shown in FIG. 4.

Alignment of the navigation system gimbals shown in FIG. 1 may be accomplished in three steps. The first step is a coarse alignment in which the gimbals are coarsely leveled to the gimbal synchro resolver nulls. During the first step, power may be applied to the rotor wheels of the gyros 42, 44 and 50 to bring them up to speed. The second step may be a fine leveling step during which the platform is established level relative to the local vertical. In this step the stabilization servo loop operation for the gyros is initiated. The output of the azimuth resolver 22 shown in FIG. 1 is read into the navigation computer 70 to be used in conjunction with externally derived vehicle heading information to establish a coarse initial value of platform heading for the resolution of earth rate into approximate X and Y axis components. Upon completion of the fine leveling step, a gyro-compassing mode is employed.

The purpose of gyrocompassing is to refine the accuracy of initial platform heading determination and to determine the current values of horizontal torquing scale factor and azimuth drift. In a conventional system these quantities are determined in a closed loop fashion which involves slaving the platform to a prescribed azimuth orientation. However, with the present system, such quantities are calculated and stored until the commencement of navigation without physical slaving of the platform to an azimuth reference. This approach, known as open loop gyrocompassing, offers the advantages of eliminating all circuitry for torquing the platform to the determined azimuth and of avoiding the introduction of Z gyro scale factor errors. Further, by determining compensations during open loop gyrocompassing with the present invention rather than the closed loop gyrocompassing of conventional systems, optimum use of available data is more easily obtainable since the computations are not encumbered with feedback considerations.

Further, because platform rotation continues throughout gyrocompassing, low frequency drift and bias errors associated with the horizontal instruments still appear as modulated errors in the geographic frame. This renders them subject to calibration and/or filtering and makes possible a level of gyrocompassing performance which a conventional system can approach only by gyrocompassing in four different platform orientations, each of which requires a gyrocompassing duration as long as the entire gyrocompassing duration of the present system. In addition, a conventional system needs time to slew from one orientation to another.

To further clarify these comments, reference will be made to a conventional system in which the intent of correct operation is to maintain two gyros and two accelerometers with their input (sensitive) axes lying in the local horizontal plane. In addition it will be assumed that a further requirement exists to maintain the input axis of one of these gyros and the input axis of one accelerometer pointing along the local meridian in a northerly direction. These instruments will hereinafter be referred to as the North gyro and the North accelerometer. The other instruments having input axes in the horizontal plane will similarly be designated the East gyro and East accelerometer.

Maintenance of this orientation requires the appropriate torquing of an azimuth gyro, which determines the azimuth orientation of the horizontal instrument package, and in general, also requires the computation of and correction for certain sensed accelerations due to the rotation of the earth, usually referred to as Coriolis accelerations. Neither of these facts is vital to the ensuing discussion and their correct mechanization will be assumed.

For simplicity the case discussed will be that in which the carrying vehicle is stationary upon the surface of the earth, that is, its ground speed is known to be zero. Under this condition a further requirement in the mechanization of the system is the provision of a torquing signal to the North gyro which causes rotation of the platform about the North horizontal axis at a rate equal to the local horizontal component of earth rotation rate. An ideal (error-free) system set up in the prescribed orientation under these conditions will continue to maintain its instrument axes along the horizontal North, horizontal East and local vertical directions. Further, since earth rotation rate is constant, the accelerometers will indicate no velocity changes along these axes. That is, the horizontal accelerometers will not experience any acceleration inputs and consequently the system outputs representing North and East velocity will, if correctly initialized, remain at zero.

A common characteristic of all gyrocompassing systems is the comparison of outputs of the inertial system with externally measured values of similar quantities for the purpose of providing a gyrocompassing control signal. In the simple case under discussion, typical compared parameters would be the North and East components of ground speed. These are known to be zero by virtue of the constraint that the vehicle is stationary on the surface of the earth. Any deviation from zero, therefore, of the North and East velocities indicated by the inertial navigator, is an indication of an error in orientation or initialization of the inertial navigator or of the presence in the navigator of uncompensated error sources (gyro drifts, misalignments of instruments, torquing scale factor errors and so on). This deviation is detectable in the velocity comparison process and the objective of gyrocompassing is to deduce as much information as possible about the faulty initialization of and error sources operative within the inertial navigator so that they may be remedied prior to embarkation upon the navigation process.

As an example, consider the perfect conventional system described above to be correctly initialized with the single exception that a heading error exists (North gyro input axis does not lie along the meridian direction and East gyro does not, therefore, point due East). Under this circumstance a torquing command to just the "North" gyro alone is not sufficient to maintain the platform at local vertical. The "East" gyro must also be torqued. Further, the rate at which the East gyro is torqued, when vectorially added to the rate the North gyro is torqued, must together produce the local horizontal earth rate about the true North axis and maintain zero rotation about the true East axis. Otherwise the platform will not be maintained level (normal to local vertical). But with a heading error at the beginning of gyrocompassing, the platform will begin to rotate about its true East axis because the necessary nulling torque is not applied to the East gyro. Having its input axis raised out of its horizontal plane by this rotation, the North accelerometer senses a component of gravity causing the generation of a finite North velocity output which in turn causes the computer to initiate torque commands to the East gyro. The rotation about the East axis is stopped when the vectorial addition of the torque to the East gyro and the torque applied to the North gyro is just sufficient to cause the gimbal torque motors to rotate the platform about a true North axis at exactly the horizontal component of local earth rate. A constant, finite North velocity output is then exhibited by the inertial system.

As a further example, consider a perfect conventional system as described above to be correctly initialized with the exception that a North gyro torquer scale factor error exists. To torque the North gyro at local earth rate requires a knowledge of the gyro torquer scale factor (i.e., the rate in radians per second caused by the application of a milliamp of current). An error in the value of this scale factor prevents the accurate application of the correct horizontal earth rate signal with the result that the North gyro produces an error signal which, when applied to the gimbal torque motors, rotates the platform about the North axis. Having its input axis raised out of the horizontal plane by this rotation, the East accelerometer senses a component of gravity to result in a finite East velocity output signal and a corresponding torquing signal to the North gyro. The North gyro torque signal eventually stabilizes at that value which maintains the platform rate about the North axis at exactly the horizontal component of earth rate. This necessitates a finite, constant East velocity output. Hence the difference between this velocity output and zero is a measure of the North gyro scale factor error and permits this error to be calibrated and compensated, provided no other drift effect is being manifested by the North gyro.

At this point it should be noted that torquer scale factor error of the East gyro cannot readily be calibrated in the East position because there, after heading correction, the gyro would normally not be torqued at all. Hence, to calibrate this scale factor requires that the East gyro be rotated to North. It is also very important to note that heading can be determined and the North scale factor error can be calibrated completely with a conventional system only if the drifts and vertical misalignments of the North and East gyros are completely compensated. Any remaining uncompensated East gyro drift would result in a platform rotation about the true East axis. This effect could not be separated from the effect of the heading error. Similarly, any bias drift of the North gyro would result in a platform rotation about the true North axis, and from data obtained in a single platform orientation, this effect would not be separable from torquer scale factor error.

With this background, the benefits of gyrocompassing as applied to the present invention may be more readily understood. In the present system, the conventional non-rotating North and East instruments are replaced by the rotating X and Y instruments. The velocities sensed by the X and Y accelerometers are resolved from the rotating X–Y frame into a locally level reference frame having some given azimuth reference; that is, the central azimuth quantity from which directional quantities are determined may be represented by any preselected angular orientation of platform 10 relative to space so long as the computer 70 records this azimuth reference and monitors platform rotation relative thereto. This may be simply referred to as a free azimuth local level frame. On the basis of these resolved accelerometer outputs, gyro torquing signals are computed and then resolved back to the rotating X–Y frame for transmission to the gyros. The azimuth position of the rotating frame is obtained from the sum of the initial position at the start of gyrocompassing and the time integral of the azimuth rate since the beginning of gyrocompassing. To furnish indicated velocity information for gyrocompassing, the resolved accelerometer outputs are also further resolved from the local-level, arbitrarily selected azimuth frame to a nominal North-East frame.

Rotation of the X and Y gyros relative to the North-East reference frame causes bias drifts associated with those gyros to generate sinusoidal North and East velocity outputs of precisely definable frequency which can be easily detected in the velocity comparison process and used to compensate for the causative drifts or subjected to effective filtering. This means that heading error, platform azimuth drift, and horizontal torquer scale factor error which produce distinguishable velocity error patterns of much lower frequencies may be determined unambiguously from North and East velocity computations. Typically, together with sinusoidal effects, the indicated North velocity, in the form of a voltage, will contain a ramp, or time increasing component, superimposed on a DC bias level of some fixed magnitude. The bias level, as previously described, is a measure of the initial heading error and the ramp a measure of the error between the assumed and actual azimuth rates. Similarly, the indicated East velocity is a measure of the average of the torquer scale factor errors of both horizontal gyros. Thus a major advantage of gyrocompassing while rotating the X–Y instruments above earth rate is the elimination of the ambiguities which formerly limited gyrocompassing accuracy and prevented the complete calibration of gyro errors.

Another major advantage of gyrocompassing in accordance with the present invention is the simultaneous calibration of average gyro torquer scale factor errors. In a platform mechanized in accordance with the present invention, calibration of average torquer scale factor represents the complete calibration of the horizontal gyro scale because under the influence of platform rotation, it is the combined effect of both scale factors which causes the navigation error. Hence, the present calibration is quite accurate for use in the later navigation mode where platform rotation continues. In a conventional system, the North and East gyro torquer scale factors act independently to produce navigation errors and require separate calibration as do North and East gyro bias drift. Such calibration of scale factor and bias drift would require gyrocompassing in a total of four different platform orientations.

Finally, the advantages of the subject gyrocompassing method extend to situations in which the vehicle is in motion and in which external velocity information is available and to situations in which external position measurements are available for use in the gyrocompassing action.

The discussion so far has shown that gyrocompassing with the present invention permits heading errors, azimuth drift rates, and average torquer scale factors to be completely identified and hence calibrated during gyrocompassing. The means for doing so will be more fully described with reference to FIG. 4. However, the present system also identifies and compensates several errors which conventional systems do not distinguish as independent errors. Consequently, conventional systems compensate not the actual arrors but the sum of all errors which produce the same effects under the particular operating conditions existing at the time of calibration. These systems are therefore limited by the extent to which they can avoid ambiguous errors. For instance, a heading error might be introduced where actually there was none just because another error, such as East gyro drift, has the same effect.

Two significant errors causing this problem in a conventional system are in gyro bias drift and the misalignment of the gyro input axis with respect to the plane defined by the input axes of the horizontal accelerometers. (This discussion assumes that the conventional platform is constrained to maintain this plane parallel to the local horizontal plane.) A bias change of the North gyro has the same effect, as explained previously, as a North gyro torquer scale factor error and a change in the bias on the East gyro has the same effect as a heading error. Further, misalignment of the North gyro into the vertical direction causes the North input axis to sense a small, but uncompensated, portion of the vertical component of earth rate at which the platform is being rotated by torquing the vertical gyro and this uncompensated portion has the same effect as a scale factor error. Similarly, a vertical misalignment of the East gyro produces the same effect as a heading error.

As a further advantage, the present system not only suppresses the effects of these bias and misalignment errors through instrument rotation but also identifies them through a procedure conducted during open loop gyrocompassing. The accurate identification of the combined effects of bias drifts and gyro vertical misalignments is made possible by the simultaneous but independent determination of the actual heading error, which, in turn, as has been shown above, is due to the suppression or cancellation of the effects of bias drifts and misalignments.

The identification procedure uses the sinusoidally varying outputs of the X and Y accelerometers produced by the rotating horizontal instruments during gyrocompassing. These outputs vary about a constant bias which represents these gyro bias and misalignment errors. Therefore, by integrating the outputs over one revolution of the platform, the varying portions of these outputs are averaged out so that only the constant portions remain. These portions allow the computation of gyro torquing commands which compensate the effects of the errors. Because the magnitudes of these biases are small compared to the amplitude of the accelerometer output signals, the integration, to be of use, must be for exactly one revolution. This accuracy is afforded mainly through the precise knowledge of azimuth and of azimuth drift obtained by the previously described unique mechanization of the Z gyro in relation to the X and Y gyros.

The gyrocompassing mode is now described with reference to FIG. 4. It is preceded by a leveling mode in which the X and Y instrument axes are brought close to coincidence with the local horizontal plane and the first steps are taken to ensure the suppression of the effects of horizontal gyro drifts and accelerometer bias offsets upon the gyrocompassing solutions. For simplicity of description the process will be described for a system in which the X and Y gyros and accelerometers nominally define the horizontal plane and rotation occurs about the azimuth gyro (Z) axis, but this expedient should not be construed as limiting the applicability of the process to other orientations of the instrument axes.

The system is initialized with the vehicle heading, latitude 102 and longitude 104. The initial value of vehicle heading is either computed in the initial azimuth computation 110 from external inputs of magnetic heading 99 and magnetic variation 97 or is available from the system computer as a stored value 96 in the situation in which the vehicle has not been moved since its last operation. The additional input of platform inner gimbal angle 98 from azimuth resolver 22 (see FIG. 1) enables computation within 110 of the platform heading 118, that is, the angle between the Y instrument and geographic North. This value of platform heading 118 is clearly limited in accuracy by the behavior of the external sources of reference. Self-contained improvement of the accuracy of knowledge of platform heading is one of the primary objectives of gyrocompassing.

The leveling process occurs in two phases. A coarse leveling phase occurs first which involves the torquing of the X and Y gyroscopes with signals 128 which are directly derived from the X and Y accelerometer outputs 92 after modification in the acceleration processor 76. The mechanics of this process are conventional and well known to those versed in the state of the art and will be minimally described here. The start of the coarse leveling phase defines the zero time reference for subsequently described events. At this time a separation occurs between the instrument (platform) reference frame and the computing reference frame. The latter is initialized at the instantaneous position of the instrument frame at zero time from the latitude 102, longitude 104 and platform heading 118 through the initial direction cosine computation unit 112 but thereafter deviates from the instrument reference frame by virtue of its much lower, arbitrarily chosen angular rate about the azimuth axis.

The necessary navigational alignment computations are effected largely in this computing frame of reference. For this reason it is necessary to provide a means for resolving the outputs of the accelerometers into the computing frame and a similar means for resolving computed gyro torquing rates in the computing reference frame back into the instrument reference frame. These resolutions are carried out respectively in the acceleration processor 76 and the gyro torquing compensator 122 and are made possible by the precise angular rate which is made to exist between the instrument frame and the chosen computing frame. The necessary angle for this resolution is obtained by integration of this relative angular rate from zero time. Necessary Coriolis' acceleration corrections and earth rate insertions to the system are effected in the computing frame using initial direction cosine values 146 and 120 respectively.

A further resolution is necessary in order to relate certain computed parameters to an earth-fixed reference frame. In the depicted configuration the parameters chosen are the inertially derived horizontal velocity components in computing axes which are resolved into North and East axes in the velocity resolver 124. As previously described, the difference between the resulting North and East velocity outputs and zero (in the stationary vehicle case) are the control quantities processed to effect gyrocompassing and instrument calibration. The angle between the computing frame and the North-East frame is initialized as described previously. A continuous knowledge of its value thereafter is computed from the predetermined azimuth rate of the computing frame and from the knowledge of the inertial rate of rotation of the local geographic frame which is simply a function of earth rate and latitude.

After some predetermined time in coarse leveling, the fine leveling phase commences. This is distinguished, not only by the use of lower leveling loop gains for the refinement of the platform level, but also by the inclusion of the sliding filter 135 and the sample and hold computation unit 106. The purpose of the sliding filter is the suppression of the sinusoidal disturbances of platform rotational frequency which appear in the North and East velocity outputs 130 and 132 due to uncompensated horizontal gyro drifts, accelerometer bias errors, and gyro input axis misalignments relative to the accelerometer axes in the vertical plane. If unsuppressed, these disturbances could typically be of such a magnitude as to jeopardize the speed and accuracy of the gyrocompassing data processing. The filter is embodied in the computer by means sampling each velocity output, summing the sampled values over a complete rotation period and averaging by division the number of samples taken in that period to obtain an average value of the velocity signal for that period. It should be noted that this type of filter provides new outputs at (sliding) time quanta determined by the sampling rate and that the rejection of sinusoids of platform rotation frequency is theoretically infinite. The values of residual output velocity signals 131 and 133 therefore are predominantly due to those errors (heading error, horizontal gyro scale factor error, azimuth gyro drift and so on) which the gyrocompassing process is intended to rectify. Typically the sliding filter is activated after a period in the fine leveling mode which is allowed for the decay of initial transients. The completion of one period of platform rotation with the sliding filter operative is the earliest time at which gyrocompassing can profitably commence.

The sample and hold computation unit 106 performs a function similar to that of the sliding filter but somewhat different in mechanization and final objective. The similarity lies in the fact that the immediate objective is the isolation of the same horizontal gyro and accelerometer bias errors with intent to reduce their effects. The differences are twofold. The mechanization involves processing of accelerometer outputs 90 and 92 in the instrument reference frame (prior to resolution into computing frame or geographic frame) where the existence of horizontal gyro bias drifts, accelerometer bias errors, and gyro-accelerometer misalignments in the vertical plane gives rise to constant (non-zero) accelerometer output signals, superimposed upon which are sinusoidal perturbations due to the existence of a heading error, horiozntal gyro scale factor errors and uncompensated azimuth drift. The sample and hold computation 106, by the process of sampling accelerometer outputs and integrating them for one complete platform rotation prior to a second sampling, serves to generate average values of the constant levels to be subsequently eliminated and to exclude the sinusoidal effects. Thus a single parameter signal at 114 is developed for each leveling loop which reflects the lumped effect of the gyro and accelerometer bias errors operative in that loop during the cycle. This parameter is not used during gyrocompassing but instead is employed to compute compensating gyro torque values which are applied to the horizontal gyros at the end of the alignment process via computing unit 112. The purpose of this compensation is the further suppression of cyclic velocity output errors which may accure during navigation from exaggerated values of uncompensated horizontal bias drift, accelerometer bias error or relative misalignment of gyro and accelerometer input axes.

Gyrocompassing and instrument calibration are effected from the filtered North and East velocity output signals 133 and 131 emitting from the sliding filter 135. Processing of the North velocity output yields information upon heading error and rate of change of heading error (platform azimuth drift). The East velocity output in turn contains information related directly to the scale factor errors of the horizontal gyros. Statistical polynominal filtering techniques are employed in the platform azimuth computation unit 140, the Z-gyro calibration computation unit 126 and the horizontal gyro scale factor computation unit 138 to yield time-optional solutions for these parameters under specified nominal conditions of operation. Thus, in a specific embodiment of the described technique, the platform azimuth computation unit 140 and the Z gyro calibration computation unit 126 are configured to optimally estimate the values of a bias (due to a constant heading error) and a ramp (due to azimuth gyro drift) in the North velocity signal which also contains noise of pre-calculated energy content due to the effects of wind gusts upon the vehicle in which the navigator is mounted. From these estimates, values of the causative heading error and azimuth gyro drift are computed which are applied to the system as a platform heading update signal 144 and an azimuth rate correction 136 at the end of the alignment process. In like manner the effect of constant scale factor errors in the horizontal gyros is the production of a bias East velocity error whose magnitude is directly related to the sum of those scale factor errors. The horizontal gyro scale factor computation in the specific embodiment described is designed to estimate this bias in the presence of precalculated wind gust noise on the aircraft and thereby to produce a compensation value 142 for the lumped scale factor errors which is applied prior to navigation. Since this lumped parameter, is in fact, that which is operative to produce navigation errors in flight, a determination of the individual horizontal gyro scale factor errors is not necessary.

In an inertial navigator constructed along conventional lines (zero or slow rotation of the horizontal instruments relative to the navigation frame of reference) a large number of error sources internal to the navigator can produce navigation errors of comparable and damaging magnitude. Typically, a list of these error sources would include three gyro drifts and two or three distinct gyro torquing scale factor errors together with initial heading error as major contributions to the limitation of navigational accuracy, and a multitude of lesser errors. With foreknowledge of the path to be followed by the carrying vehicle over the surface of the earth, the mechanism of propagation of the effects of these major error sources into navigation errors is precalculable and, for simple flight paths (for example, great circle), is expressible in terms of a set of constant coefficient linear differential equations. In such a simple situation the complete calibration of the system during navigation requires the acquisition by external means of a sufficient number of perfect position fix data points to allow explicit solution of this set of equations. That is, one component of external position information will be required for each major error source or initialization error in the system. In the general case then the type of conventional system defined in this paragraph would require three position fixes (each providing two orthogonal components of position error) for complete calibration of major system errors. In addition, certain singularities may exist which render an unambiguous calibration impossible even with this amount of external information. Thus the existence in the system of two error sources which give rise to colinear position errors precludes individual calibration of either source effect. (A classical example of this situation is the equivalence of East gyro drift and heading error in a stationary inertial system or in one which is aligned and used to navigate an easterly moving vehicle.)

The linear equations governing error propagation contain coefficients determined by the flight path. Thus in the more realistic situation in which no prior constraints are placed upon the motion of the vehicle over the surface of the earth, these coefficients will exhibit complex time-varying characteristics. In order to retain appreciable calibration capability under these circumstances, it is necessary to include in the vehicle system a method for computing the effect of past flight path perturbations upon the current values of position output errors due to known error source types in the navigator. That is, it is necessary to carry an error propagation model for the system (in the form of the aforementioned linear equations) whose coefficients are modified by knowledge of the vehicle motion gathered during in-flight operation of the navigator. The external data input requirements described in the previous paragraph have not been changed by this necessity but the magnitude of the on-board computational task has been considerably enlarged in the case of the conventional navigator. This enlargement results from the fact that the complexity of the error model computations needed is a direct function of the number of major error sources which demand recognition in the system.

The navigation system constructed in accordance with the present invention, on the other hand, exhibits only two significant sources of error. In an adequate alignment process, the initial heading error of the system is reduced to a very low value by virtue of the benefits of platform rotation and the filtering process previously described. In addition, this azimuth solution is achieved in a time which is short compared to that required for azimuth gyro drift calibration and which is, in general, consistent with current concepts of rapid reaction. The initial calibration of horizontal gyro torquer scale factor occurs in a similarly short period of time. Thus in a typical situation the dominating error source upon entry into navigation is uncompensated azimuth gyro drift. During navigation the error propagation will, in general, be augmented by increased drift of the azimuth gyro accrued as a result of its random drift behavior and like deviations of the horizontal gyro scale factor from the compensated value. Of these two significant error sources, that due to azimuth gyro drift is typically of preponderant magnitude. In any case these two error sources act about orthogonal axes—azimuth gyro drift being operative about the azimuth axis and the effective horizontal gyro scale factor error being operative as a drift about a horizontal axis which is normal to the inertial track of the vehicle. The resulting positional errors are composed of two essentially orthogonal components, one attributable to each source, and individual determination of each error source is possible from one perfect position fix (assuming an adequate pre-flight alignment process) containing two components of position error information.

Figure 5:
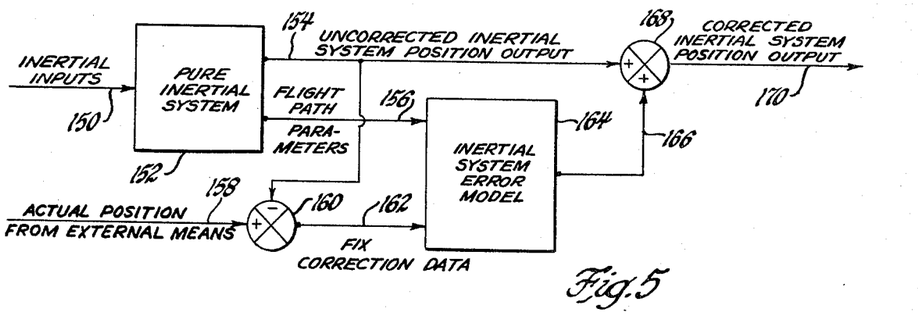
FIG. 5 is a simplified schematic diagram of the fix correction technique.

The general organization of the system update mechanization from external position data is presented in FIG. 5. Here the inertial navigator 152, acted upon by the accelerations 150 of the carrying vehicle, generates a computed position output 154 which contains errors due to error sources internal to the navigator. At the receipt of an external measurement of present position 158 a comparison of the two indications of positions at 160 provides a measurement of the position error 162. Throughout flight an inertial system error model 164 is retained in the system computer which accepts flight path parameters 156 from the inertial navigation computations for the purpose of maintaining a dynamic representation of system error propagation characteristics through the flight. This model is further supplied with signals which are unit representations of each major error source in the system and consequently delivers an output 166 corresponding to the position error which would accrue from the presence of unit errors in the inertial system. This output is compared, component for component, with the measured value of position error 162. Hence model 164 combines corrections 162 with flight path parameters 156 in a manner to generate the best estimates of position corrections 166. Correction 166 is then combined at 168 with uncorrected position output 154 to generate a corrected output 170. In the simple situation provided by a navigation system constructed in accordance with the present invention, an estimate of the azimuth gyro drift operative over the period of navigation since takeoff is generated by a simple division of the cross-inertial track component of actual position error by that due to unit azimuth drift. Similarly division of the along-inertial track component of actual position error by that derived in the error model from unit scale factor error input provides an estimate of the mean scale factor error operative over the navigation phase to the time of fix-taking.

Figure 6:
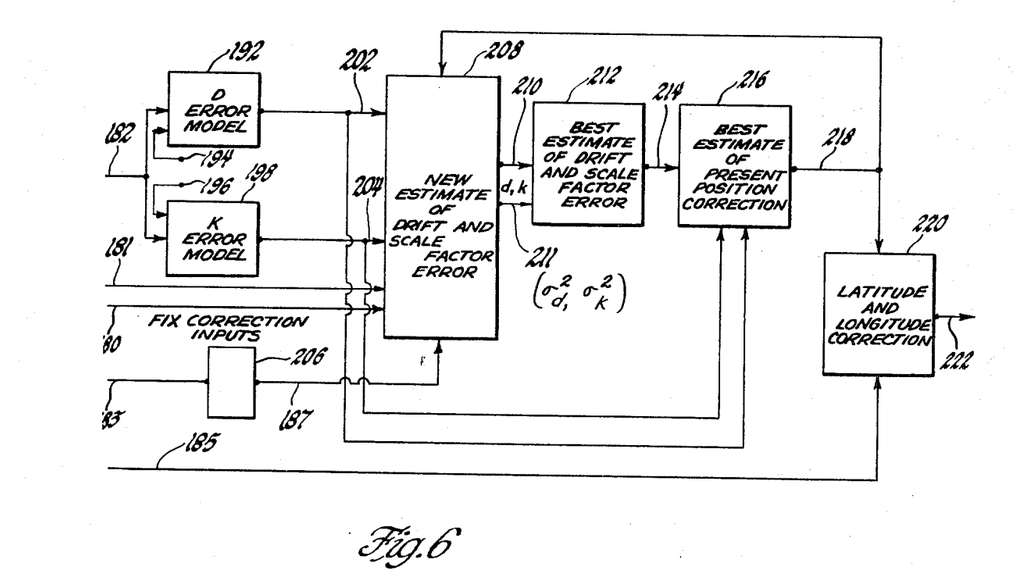
FIG. 6 is a data flow diagram indicating in detail the manner in which a fix correction is made in accordance with the present invention.

A more detailed representation of this position fix utilization technique as formulated in a specific embodiment of the present invention is portrayed in FIG. 6. There it is evident that the system error model consists of two parts, the D error model 192 devoted to description of the propagation of azimuth gyro drift error in the system and the K error model 198 which relates to horizontal gyro torquer scale factor. The unit error inputs to these models are 194 and 196 respectively. Both models are activated on entry of the system into the navigate mode. The D error model output 202 consists of two quantities $A_1(t)$ and $A_3(t)$ representing the along and across (instantaneous ground) track errors attributable to the action of unit azimuth gyro drift throughout the flight. Output 204 contains similar quantities $A_2(t)$ and $A_4(t)$ attributable to unit horizontal gyro torquer scale factor error.

Computation 208 is devoted to the derivation of new estimates of azimuth drift and horizontal torquer scale factor error at the receipt of a new position fix. Since it accepts, as inputs, coefficients 202 and 204 from the error models 192 and 198, both of which relate to the total navigation time, it is necessary to store the total error generated by the inertial navigator during the entire flight. This total error consists, in general, of two parts—a part 218 which was corrected at the last fix and a part 180 which has accrued since the last fix. The latter input (180) is obtained directly from the comparison of the inertial navigator indicated position with the position obtained from the external means. The estimates of azimuth drift, $d$, and horizontal gyro scale factor error, $k$, distinguished by lower case letters, are mean values operative over the time of flight to date and are deduced from simultaneous solution of the equations $$A_1 d + A_2 k = \text{Total along track error}$$
$$A_3 d + A_4 k = \text{Total cross track error}$$

where $A_1$, $A_2$, $A_3$, $A_4$ are the output influence coefficients of the error models 192 and 198 at the instant of fix-taking and $d$ and $k$ are outputs 210 which are put into the best estimate of drift and scale factor error computation 212 unit.

It should be noted at this point that prior estimates of the azimuth drift ($D_{n-1}$) and torquer scale factor error ($K_{n-1}$) already exist in the system. These are formed either as end results of the application of the fix correction process (herein described) at a prior fix point or are zero values which represent the best estimates of these quantities at the end of the ground alignment process. In general, the best available estimates of current azimuth drift ($D_n$) and torquer scale factor error ($K_n$) at the time of a new fix will be functions of the newly derived mean values ($d$, $k$) for the entire flight and also functions of the prior estimates ($D_{n-1}$, $K_{n-1}$). Thus two pieces of data are available for the best determination of each parameter. In the specific embodiment under discussion these two pieces of data are assumed to be independent measurements of the parameters taken in the presence of additive, independent, normally distributed and unbiased noise. Also the "best" estimate of the current value of the parameter is interpreted to be the maximum likelihood estimate. Under these conditions the maximum likelihood estimate of, for example, the current azimuth drift is a linear combination of the two pieces of data. Thus $$D_n = (1 - F_1) D_{n-1} + F_1 d$$

where $F_1$ is a simple function of the variances of the noises affecting each data measurement. Accordingly an additional function of computation 208 is the determination of the variances $\sigma_d^2$, $\sigma_k^2$ associated with the newly derived data ($d$, $k$). These variances form the other input 211 to the best estimate of drift and scale factor error computation 212. They are derived in computation 208 from along and across track position error variances 181 (which relate to the noise inherent in the fix-taking process and equipment) and from along and across track position error variances 187 attributable to noise sources in the inertial navigator other than azimuth gyro drift or horizontal scale gyro factor error. These latter variances (due to inertial navigator error sources) are functions of time of navigation and flight path and this fact is taken into account in computation 206 which accepts influence coefficients 183 from the navigation computations to generate the appropriate inertial position variances.

The best estimate of drift and scale factor error computation 212 is devoted to the determination of $D_n$ and $K_n$ from linear combinations of $D_{n-1}$, $d$ and $K_{n-1}$, $k$ of the form described in the previous paragraph. The error variances $\sigma_{D_{n-1}}^2$ and $\sigma_{K_{n-1}}^2$ associated with the best estimates of drift and scale factor at the prior fix point are available from the application of the process herein described at that point in time. Similarly, included in computation 212 is the determination of the variances $\sigma_{D_n}^2$ and $\sigma_{K_n}^2$ for future application. Initial values of these variances $\sigma_{D_0}^2$ and $\sigma_{K_0}^2$ are inserted at the start of navigation and are functions of alignment time.

Since it is admitted that the position fixing operation may itself be in error due to imperfections in the external measurement apparatus, it is clearly not an optimum procedure to apply corrections to indicated present position as though that operation yielded perfect inputs. Instead the best estimates of present position correction 218 are computed in 216 from the best estimates of operative drift and scale factor errors using current values of the along and cross track influences coefficients 202 and 204 from the dynamic models 192 and 198. Since it is desired to establish a new set of position corrections and error source estimates at each subsequent position fix, information of the application of particular corrections 218 to the system position outputs at a given fix operation must be transmitted to the computational block 208 as a basis for computation affecting the next flight leg. Finally, the transformation of appropriate position correction into geographic (latitude-longitude) coordinates 222 is effected in computation 220 by resolution through the angle 185 between the computing reference frame and the geographic reference frame which is available from the navigator computations.

In summary, the principal approach is to employ system mechanization techniques that free the navigation accuracy from dependence upon the bias stability of inertial instruments. The mechanization techniques employed include rapid rotation of the horizontal instrument cluster about the azimuth axis, in order to modulate the low frequency errors of the horizontal instruments, and an optimal filtering alignment process, in order to accomplish minimum time calibration of azimuth drift and horizontal gyro torquer mean scale factor.

The simplication of the system error model that results from modulation of horizontal bias errors makes it feasible to update the system in flight from a single position fix. An error model for unit azimuth drift and unit horizontal gyro scale factor (two orthogonal errors) is maintained throughout the mission, and is used to update the calibrations of these quantities whenever a position fix is obtained. Rotation of the horizontal gyroscopes also reduces sensitivity to the low altitude vibration environment by modulating the major compliance drift to the horizontal gyroscopes.

We claim:

1. In an inertial navigation system, apparatus the normal mode of operation of which is to obtain navigational information including acceleration of a vehicle being navigated comprising a platform, at least two single degree of freedom gyros mounted on the platform, each in a fixed orientation relative thereto and having their input axes defining a pair of coordinate axes having a fixed angular interrelation, at least two accelerometers mounted on the platform, each in a fixed orientation relative thereto with the input axes thereof disposed for measuring accelerations along axes bearing a predetermined angular relationship to the coordinate axes, and means for rotating the platform continuously throughout the normal mode of operation about an axis orthogonal to both said coordinate axes at a predetermined rate relative to inertial space substantially above earth rate thereby to reverse the input axes of the gyros and the accelerometers.

2. In an inertial navigation system, apparatus as defined in claim 1 wherein said rate is constant.

3. In an inertial navigation system, apparatus the normal mode of operation of which is to obtain navigational information including accelerations of a vehicle being navigated comprising a platform, gyro means mounted on the platform in a fixed orientation relative thereto and having angularly spaced input axes defining a set of coordinate axes, accelerometer means mounted on the platform in a fixed orientation relative thereto and having input axes bearing predetermined angular relations to the coordinate axes, means for rotating the platform continuously throughout the normal mode of operation about a selected axis which is angularly spaced from each of said input axes at a predetermined rate relative to inertial space.

4. In an inertial navigation system for aircraft moving relative to the surface of the earth, apparatus as defined in claim 3 wherein said rate is constant and substantially above earth rate, the apparatus further including means connected to the gyro means for maintaining said selected axis parallel to a local vertical.

5. In an inertial navigation system, apparatus the normal mode of operation of which is to obtain navigation information including accelerations of a vehicle being navigated comprising a platform, at least two single degree of freedom gyros mounted on the platform each in a fixed orientation relative thereto with the input axes thereof defining at least two coordinate axes having a predetermined fixed interrelation, accelerometer means mounted on the platform in a fixed orientation relative thereto for measuring accelerations of the platform along axes bearing a predetermined angular relation to the coordinate axes, and means for rotating the platform continuously throughout the normal mode of operation about an axis orthogonal to both of said coordinate axes at a predetermined rate relative to inertial space substantially above earth rate.

6. In an inertial navigation system, apparatus the normal mode of operation of which is to obtain navigation information including acceleration of a vehicle being navigated comprising a platform, gimbal means for mounting the platform to the vehicle and for permitting the platform to be angularly reoriented relative to the vehicle about each of three mutually perpendicular gimbal axes, two single degree of freedom gyros mounted on the platform each in a fixed orientation relative thereto with the input axes orthogonally aligned with respect to each other, stabilization means including torquing means interconnecting the gyros and the gimbal means for maintaining the input axes in a horizontal plane relative to a local vertical, two accelerometers mounted on the platform each in a fixed orientation relative thereto for sensing horizontal components of accelerations of the platform, and means for continuously rotating the platform throughout the normal mode of operation about a locally vertical axis at a predetermined rate relative to inertial space substantially above earth rate.

7. In an inertial navigation system, apparatus as defined in claim 6 further including digital computer means for deriving vehicle position information from signals produced by the said accelerometers, and means connecting the accelerometers to the digital computer means including resolver means for transforming the signals from the rotating accelerometers to an azimuthally fixed reference frame.

8. In an inertial navigation system, apparatus the normal mode of operation of which is to obtain navigation information including accelerations of a vehicle being navigated and carrying said apparatus comprising a platform having first and second discrete portions, gimbal means for mounting the platform to the vehicle and for permitting the platform to be angularly reoriented relative to the vehicle about each of three mutually perpendicular gimbal axes, two single degree of freedom gyros mounted on the first portion each in a fixed orientation relative thereto and with the input axes thereof angularly spaced apart, two accelerometers mounted on the first portion each in a fixed orientation relative thereto and with the input axes aligned with the input axes of respective gyros for measuring accelerations of the platform along such axes, stabilization means for maintaining the input axes of the gyros and accelerometers in a locally horizontal plane, a third single degree of freedom gyro mounted on the second portion in a fixed orientation relative thereto and with the input axis thereof aligned perpendicular to the input axes of each of said two single degree of freedom gyros, means connected to said third gyro for maintaining the second portion in a predetermined orientation about the input axis of the third gyro relative to inertial space, and means for rotating the first portion relative to the second portion about the input axis of said third gyro continuously throughout the normal mode of operation at a predetermined rate substantially above earth rate.

9. In an inertial navigation system, apparatus the normal mode of operation of which is to obtain navigation information including accelerations of a vehicle being navigated and carrying said apparatus comprising a platform having first and second discrete portions, gimbal means for mounting the platform to the vehicle and for permitting the platform to be angularly reoriented relative to the vehicle about each of three mutually perpendicular gimbal axes, two single degree of freedom gyros mounted on the first portion each in a fixed orientation relative thereto and with the input axes thereof angularly spaced apart, two accelerometers mounted on the first portion each in a fixed orientation relative thereto and with the input axes aligned with the input axes of respective gyros for measuring accelerations of the platform along such axes, first and second stabilization means respectively interconnecting said gyros and the platform for maintaining the input axes of the gyros in a locally horizontal plane, a third single degree of freedom gyro mounted on the second portion in a fixed orientation relative thereto and with the input axis thereof aligned perpendicular to the input axes of each of said two single degree of freedom gyros, third stabilization means connected to said third gyro for stabilizing the second portion about the input axis of the third gyro relative to inertial space to establish an azimuth reference, and means including a synchronous motor connected between said first and second portions for rotating the first portion relative to the second portion about the input axis of the third gyro continuously throughout the normal mode of operation at a rate substantially above earth rate.

10. A method of inertial navigation employing a system the normal mode of operation of which is to obtain navigation information and including a platform carrying three single degree of freedom gyros each in a fixed orientation relative thereto with the input axes mutually perpendicular and at least two accelerometers each in a fixed orientation relative thereto with the input axes thereof corresponding to the input axes of respective gyros, the method including the steps of maintaining the input axes of two of the gyros and two of the accelerometers in a locally horizontal plane, rotating the platform continuously throughout the normal mode of operation about a locally vertical axis at a predetermined rate relative to inertial space substantially above earth rate and transforming the navigation information from the accelerometers from a rotating reference frame to an azimuthally fixed reference frame for position computation.

11. A method of inertial navigation employing a system the normal mode of operation of which is to obtain navigation information and including a platform having first and second discrete portions, the first portion carrying in fixed relation thereto two single degree of freedom gyros having orthogonal input axes and two accelerometers having orthogonal input axes, the second portion carrying in fixed relation thereto one single degree of freedom gyro having an input axis orthogonal to the input axes of each of said two gyros, the method comprising the steps of maintaining the input axes of said two gyros in a locally horizontal plane, maintaining the second portion in a predetermined orientation about the input axis of said one gyro relative to inertial space, rotating the first portion relative to the second portion about the input axis of said one gyro continuously throughout the normal mode of operation and at a predetermined rate substantially above earth rate, and transforming the navigation information from the accelerometers from a rotating reference frame to an azimuthally fixed reference frame for computation purposes.

12. In an inertial navigation system for vehicles navigating relative to the earth, apparatus the normal mode of operation of which is to obtain navigation information including acceleration of the vehicle, the apparatus comprising a platform having first and second discrete portions, gimbal means for mounting the platform to the vehicle and for permitting the platform to be angularly reoriented relative to the vehicle about three mutually perpendicular gimbal axes, a pair of single degree of freedom gyros mounted on the first portion each in a fixed orientation relative thereto and having the input axes thereof perpendicular, first and second accelerometers mounted on the first portion each in a fixed orientation relative thereto and having the input axes thereof perpendicular, first and second stabilization means interconnecting the pair of gyros and the gimbal means for maintaining the input axes of the pair of gyros and the first and second accelerometers in a locally horizontal plane, a third single degree of freedom gyro mounted on the second portion in a fixed orientation relative thereto and having the input axis normal to said horizontal plane, third stabilization means interconnecting the third gyro and the gimbal means for maintaining the second portion irrotational relative to inertial space about the input axis of the third gyro and motor means mounted on one of the platform portions for rotating the first portion relative to the second portion about the input axis of the third gyro continuously throughout the normal mode of operation at a predetermined rate relative to inertial space substantially above earth rate whereby the first portion rotates relative to the second portion at said rate irrespective to azimuth changes of the vehicle.

13. In an inertial navigation system, apparatus as defined in claim 12 wherein said motor means comprises a synchronous motor having an output shaft, mechanical drive means connecting the output shaft to the other of the platform portions and a source of signals having a predetermined frequency connected to the motor to determine said rate of rotation.

References Cited

UNITED STATES PATENTS

| | | |
|---|---|---|
| 3,028,592 | 4/1962 | Parr et al. |
| 3,052,129 | 9/1962 | Rocks ______________ 74—5.34 |
| 3,222,795 | 12/1965 | Gevas. |
| 3,281,581 | 10/1966 | Lerman et al. |
| 3,310,986 | 3/1967 | Baecher. |
| 3,312,423 | 4/1967 | Welch. |
| 3,355,944 | 12/1967 | Levine et al. |

ROBERT B. HULL, Primary Examiner

U.S. Cl. X.R.

33—226; 74—5.34

PO-1050
(5/69)

UNITED STATES PATENT OFFICE
CERTIFICATE OF CORRECTION

Patent No. __3,509,765__   Dated __May 5, 1970__

Inventor(s) __Kenneth M. Stevenson, Jr., Robert L. Berg, Arnold A. Weiss, James L. Stockard, & Robert F. Shipp__

It is certified that error appears in the above-identified patent and that said Letters Patent are hereby corrected as shown below:

In the Specification, Column 4, line 49, "rings" should read -- ring --. Column 7, line 26, "or land sea going" should read -- or land and sea going --; line 44, "diginal" should read -- digital --. Column 8, line 59, "approximate" should read -- appropriate --.

SIGNED AND
SEALED
SEP 15 1970

SEPT. 15, 1970

(SEAL)
Attest:

Edward M. Fletcher, Jr.
Attesting Officer

WILLIAM E. SCHUYLER, JR.
Commissioner of Patents